United States Patent

[11] 3,582,560

[72] Inventors Ralph D. Banks
New York, N.Y.;
David M. Mandelbaum, Clifton, N.J.
[21] Appl No 749,852
[22] Filed Aug. 2, 1968
[45] Patented June 1, 1971
[73] Assignee Communications & Systems, Inc.
Paramus, N.J.

[54] MULTISTAGE TELEPHONE SWITCHING SYSTEM FOR DIFFERENT PRIORITY USERS
6 Claims, 10 Drawing Figs.

[52] U.S. Cl. .......... 179/18,-
179/18(GE)
[51] Int. Cl. .......... H04m 3/38
[50] Field of Search .......... 179/22,
18.19, 18.7 (Y)

[56] References Cited

UNITED STATES PATENTS

| | | | |
|---|---|---|---|
| 3,410,962 | 12/1968 | Basset et al. | 179/22 |
| 3,313,888 | 4/1967 | Ohno | 179/22 |
| 3,214,524 | 10/1965 | Warman | 179/22 |

*Primary Examiner*—Kathleen H. Claffy
*Assistant Examiner*—Thomas W. Brown
*Attorney*—Hopgood and Calimafde

ABSTRACT: Known switching arrays service subscribers in either a blocking or a totally nonblocking manner. This invention provides modified nonblocking arrays to service group of subscribers, some of which will be given nonblocking service while the rest will be given service at a prescribed blocking probability. The system is illustrated for three- and five-stage symmetrical arrays and may be extended to arrays having a greater number of stages. Any number of subscriber groups can be serviced with different specified blocking probabilities by such arrays, which are called partitioned switching arrays.

INVENTORS
RALPH D. BANKS
DAVID MANDELBAUM
BY
Hopgood & Calimafde
ATTORNEYS

INVENTORS
RALPH D. BANKS
DAVID MANDELBAUM
BY
Hopgood & Calimafde
ATTORNEYS

INVENTORS
RALPH D. BANKS
DAVID MANDELBAUM
BY
Hopgood & Calimafde
ATTORNEYS

MULTISTAGE TELEPHONE SWITCHING SYSTEM FOR DIFFERENT PRIORITY USERS

I. INTRODUCTION

This invention relates to a switching array in a telephone system, and more particularly, relates to a switching system for connecting different priority users.

Switching arrays having nonblocking capabilities are well known in the art. The two main classes of switching arrays are:

1. totally nonblocking arrays; and
2. those with a nonzero probability.

In these arrays, the switching arrays were of a symmetrical nature and all subscriber lines were afforded the same degree of blocking probability.

For purposes of definition, a totally nonblocking array denotes an array in which any two idle subscribers can always be connected together regardless of the other traffic through the array. Therefore, a subscriber having maximum priority of access, must have totally nonblocking probability.

For example, for a square array having $N$ inputs and $N$ outputs, the number of cross-points $C$ equals $N^2$. Therefore, $N$ connections can be made without blocking between inputs and outputs. The number of switching stages, $s$ is 1, so that the number of cross-points C ) is:

$$c(1)=N^2.$$

A cross-point is used herein to mean a switching cross-point, or cross-point sets located at the vertical-horizontal locations. An array is nonblocking for so long as there remains an idle outlet for which any input may have unimpeded access to it upon demand, and a particular cross-point is unique to each input-output connection.

A cross-point (or cross-point switch) may be mechanical, electronic, etc., well known in the art, to electrically connect a horizontal and vertical line.

For reasons well known, single stage nonblocking arrays are economically impractical for large subscriber systems and require large numbers of cross-points, and intermediary stages have been used as discussed in Clos, "A Study of Nonblocking Switching Networks," *Bell Sys. Tech. J.*, Vol. 32, PP. 406—424, Mar. 1953; Bowers, "Blocking in 3-Stage Folded Switching Arrays," *IEEE Trans. Communication Technology*, Vol. COM–13, pp. 14—37, Mar. 1965; Zarouni, "Switching System," U.S. Pat. No. 3,041,409, June 26, 1962; as well as our article "Partitioned Switching Arrays," *IEEE Transactions on Communication Technology*, Vol. Com–15, No. 6, Dec. 1967.

The use of intermediary stages is common. In most practical switching arrays handling more than 100 lines or trunks, multistage arrays are utilized. Many modern blocking telephone switches utilize four- or eight-stage arrays. For nonblocking and partitioned arrays, three-, five-, and seven-stage arrays are most common. These arrays, however, prove to be not as efficient at above 250 lines, 1,500 lines, and several thousand lines, respectively.

For reasons discussed in Bowers and clos, two-stage switching arrays are never completely nonblocking and the three-stage array has been developed using an intermediate matrix. In general, the "folded" three-stage switching array has been utilized in which a large group of trunks requiring individual access to one another are switched on a "both way" basis, and Bowers and Zarouni have described such systems.

We recognize that the ideal solution for insuring good service through an array under emergency conditions when traffic increases, is to use the totally nonblocking array. But this system gives totally nonblocking service to all users, nonpriority as well as priority.

For a few hundred or more subscriber lines in a folded three-stage system, the number of cross-points needed for a totally nonblocking array is considerably greater than for an array with a nonzero blocking probability. For nonblocking switches handling more than 500 lines, the number of cross-points increases at a rapid rate.

An object of this invention is to provide a simple and economical system for connecting the subscriber having different levels of priority of use.

Another object of this invention is to provide a switching array in which a priority is accorded to the users terminal.

A further object of this invention is to accommodate users with several precedence levels, as well as to provide an efficient switching system affording several grades of service.

A further object of this invention is to provide a partitioned switching array in which a subset of the subscribers are served in a nonblocking manner and the remainder with an assigned nonzero blocking probability for an assumed switch link traffic loading.

A still further object of this invention is to provide a minimum number of cross-points in an array serving $N$ subscribers at a blocking probability of $P_1$ and another set of subscribers having a blocking probability of $P_0$.

Still another object of this invention is to minimize the number of cross-points used in a space division switching array.

Yet, a further object is to accomplish a cross-point savings while retaining nonblocking service to high priority users and providing plural, different blocking grades of service according to other users and according to priority.

Briefly, in our invention, the switching system provides different grades of service to priority and nonpriority users. User terminals are assigned different grades of priority according to use. A folded array is utilized in which the middle stages of the array are partitioned into subsections having independent functions for the different priority users involved.

II. PARTITIONED THREE-STAGE SWITCHING ARRAY WITH TWO GRADES OF SERVICE

A nonblocking three-stage folded switching array serving $N$ subscribers is described herein. By deleting certain portions of a number of middle stage matrices, a subset of subscribers $N_1$ will still be afforded nonblocking service while the remaining subscribers will be afforded service at a nonzero probability of blocking. For a specified number of total subscribers and a limited percentage of nonblocking service subscribers, the number of cross-points in the resulting partitioned switching array is significantly less than the number of cross-points needed for the original totally nonblocking switching array.

The above-mentioned and other features and objects of this invention and the manner of attaining them will become more apparent and the invention itself will be best understood by reference to the following description of the embodiments of the invention taken in conjunction with the accompanying drawings, wherein:

FIG. 1*a* is a diagram of a three-stage folded switching array;

FIG. 1*b* is a diagram of the middle stage matrix;

Figure 1A:
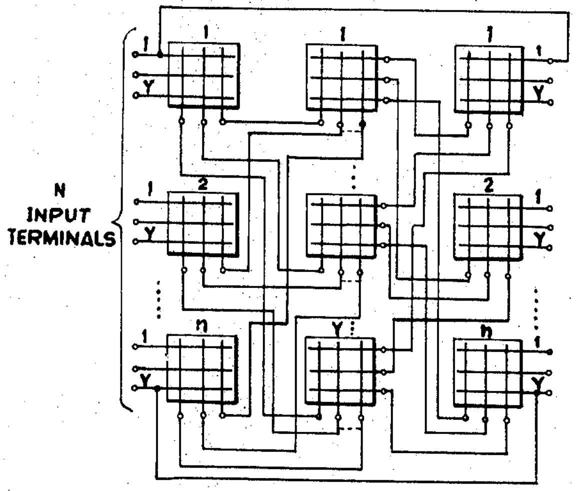

FIG. 1*a* shows a three-stage folded switching array which is known in the art. All first and third stage matrices are similar. Corresponding input lines on the first and third stage matrices are connected together as shown. It is known that the three-stage folded array will be totally nonblocking when the number of middle stage matrices is equal to the number of input lines entering any one first or third stage matrix As a result all matrices are square and therefore there is no concentration introduced in the first or third stage matrices In this folded array it is noticed that the higher numbered first and third stage matrices are connected to the lower right-hand portions of the middle stage matrices by the internal links between stages. Therefore, removal of these portions of some second stage matrices will cause the service afforded to these lines to change from nonblocking to blocking.

Assume that it is desired that a subset $N_1$ of the $N$ subscribers served by this array be provided nonblocking service while the remainder be provided service with some nonzero probability of blocking. Assume also that each primary stage switch serves $y$ subscribers.

Figure 1B:
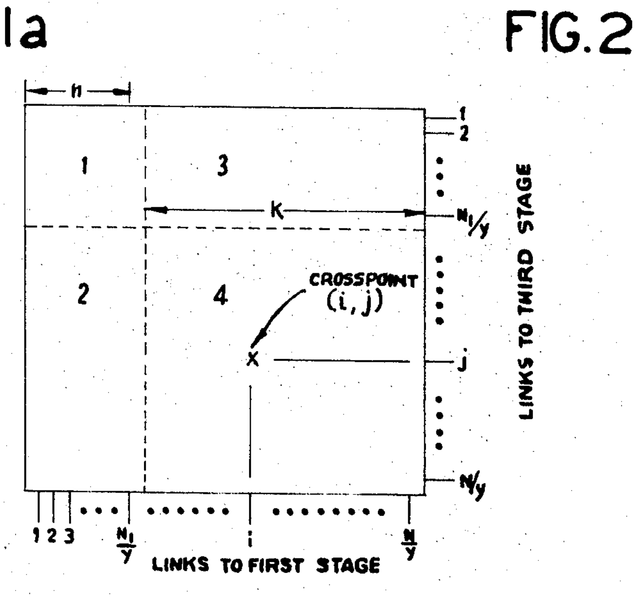

FIG. 1*b* shows a square middle stage matrix. The incoming links from the first stage matrices are shown entering the matrix on the bottom. Link 1 comes from the first (top) matrix in the first stage, link $i$ comes from the $i$th matrix in the first stage, and so on. The links from the third stage appear on the right-hand side of this matrix. Link l comes from the first (top) matrix in the third stage, LINK $j$ comes from the $j$th matrix in the third stage, and so on. A cross-point in any middle matrix will be identified by the coordinates ($j$) meaning it can connect the $j$th link from the first stage with the $j$th link of the third stage. [See FIG. 1*b*.]

There are a total of $N/y$ links from all first stage matrices and $N/y$ links from all third stage matrices to each second stage matrix. Therefore, there are ($N/y$th 2 cross-points in each second stage matrix to give nonblocking connections between these two sets of links.

Now consider the middle matrix cross-points needed in the connection of any link to the third stage with a link coming from any one of the first $N_1/y$ first stage matrices. These serve the subscribers labeled 1, 2,..., $N_1$. We assume that $N_1$ is a multiple of $y$. These crosspoints are then given by $(i, j)$ where $1 \leq i \leq N_1/y$ and $1 \leq j \leq N/y$. This set of crosspoints forms a rectangle containing $N/y \times N_1/y = NN_1/y^2$ crosspoints. It has height $N/y$ and width $N_1/y$. This rectangle lies on the left-hand side of the matrix.

Likewise, the cross-points used in connecting any link from the first stage to any link from one of the first $N_1/y$ third stage matrices is given by the set of crosspoints $(i, j)$ where $1 \leq j \leq N_1/y$ and $1 \leq i \leq N/y$. This set forms a rectangle lying on the top portion of the second stage matrix. It has a height $N_1/y$ and width $N/y$. These two rectangles overlap in a $N_1/y \times N_1/y$ square. This square is composed of those cross-points given by $(i, j)$, $1 \leq i, j \leq N_1/y$. Thus, the set of cross points involved in any connection involving one of the first $N_1/y$ first or third stage matrices is given by $(i, j)$ where either $i$ or $j$ (or both) is less than or equal to $N_1/y$. The integer $h$ is defined by $h = N_1 y$. Also $k$ is defined by $k = N_2/y$, where $N = N_1 + N_2$ is the total number of subscriber lines serviced by the array. It is assumed that $N_2$ is a multiple of $y$.

Consider the cross-points in the second stage involved in a connection between a link originating from one of the last $k$ first stage matrices and any other link; that is, a connection from any link to one of the first stage matrices labeled $h+1$, $h+2$, ..., $h+k1$, $h+k$. These matrices serve the last $N_2$ subscribers; that is, those labeled $N_1+1$, $N_1+2$, ..., $N_2-1$, $N_2$. The set of cross-points in all second stage matrices involved in this connection is given by the coordinates $(i, j)$ where $N_1/y < i \leq N/y$ and $1 \leq j \leq N/y$. Likewise the set of coordinates involved in a connection between any link from the last $k$ third stage matrices to any other link to the first stage involves the set of second stage cross-points given by $(i, j)$ where $N_1/y < j \leq N/y$, and for $1 \leq i \leq N/y$.

It is therefore seen that links connecting the last $k$ matrices in the first stage with the last $k$ matrices in the third stage use the set of coordinates in any second stage matrix given by $(i, j)$ where $N_1/y < i, j \leq N/y$; or equivalently $h < i, j \leq h+k$. This set of cross-points forms a square of side $k$ cross-points lying in the lower right-hand side of each second stage matrix. This square contains $k^2 = N_2^2/y^2$ cross-points.

Figure 2:
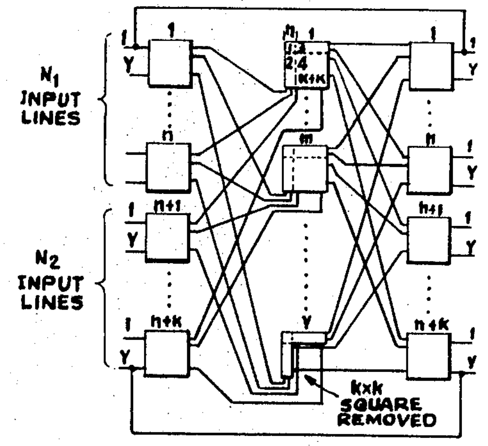
FIG. 2 is a diagram of the two priority versions of the three-stage folded partitioned array of our invention.

To summarize, FIG 2 shows a second (middle) stage matrix partitioned into four sections. These sections perform independent path switching functions. Section 1 contains the cross-points given by the coordinates $(i, j)$ where $1 \leq i, j \leq h = N_1/y$. These cross-points are used exclusively for connecting the links between the first $N_1/y$ matrices of the first and third stages. These matrices serve the first $N_1$ subscribers. Section 2 is composed of cross-points whose coordinates are given by $(i, j)$ where $1 \leq i \leq h = N_1/y$ and $h < j \leq h+k$ where $k = N_2/y$. These cross-points serve exclusively the connections between the first $N_1/y$ first stage matrices serving the first $N_1$ subscribers and the last $N_2/y$ third stage matrices serving the last $N_2$ subscribers. Similarly, the crosspoints of section 3 are given by the coordinates $(i, j)$ where $h < i \leq h+k$ and $1 \leq j \leq h$. Then these crosspoints serve exclusively to connect links between the last $N_2/y$ first stage matrices and the first $N_1/y$ third stage matrices. Section 4 contains crosspoints given by the coordinates $(i, j)$ where $h < i, j \leq h+k$. These crosspoints serve exclusively to connect links between the last $N_2/y$ matrices serving the last $N_2$ subscribers of both the first and third stages.

Therefore, it is seen that the removal of some of the section 4 squares consisting each of $k^2$ cross-points will only affect and diminish the service for calls wholly between the last $N_2 = N - N_1$ subscribers. Of course, if all such squares are removed from all middle stage switches, then the blocking probability is one so that no call can be established among subscribers within this latter group. It is seen that nonblocking service is retained for calls between a subscriber from the first $N_1$ subscribers and a subscriber from the last $N_2$ subscribers. This is because sections 2 and 3 are retained and only the cross-points therein are involved in such calls.

The number of cross-points in the original nonblocking three-stage folded array is:

$$F_3 = Ny + Y(N/Y)^2 = 2Ny + N^2/Y \quad (1)$$

where $N$ is the total number of subscriber lines and $Y$ the number of lines entering a first or third stage matrix and also the total number of middle matrices.

The number of cross-points $F_3^*$, $F_3^* = F_3 -$ [cross-points removed], in a partitioned three-stage folded array formed by removing $y-m$ squares of dimension $k \times k$ is:

TABLE 1

Crosspoint comparison for partitioned three-stage array with varying number of lines receiving nonblocking service and other lines receiving $P_L = R_{01}$ blocking service (worst case)

| $N_1$ | $N_2$ | lated Y | Actual value of $y$ used | $h$ | $k$ | $m$ | Total number of cross-points | Percentage of cross-points [1] |
|---|---|---|---|---|---|---|---|---|
| 0 | 300 | ---------- | 10 | 0 | 30 | 3 | 8,700 | 59 |
| 10 | 290 | 9.8 | 10 | 1 | 29 | 3 | 9,113 | 62 |
| 20 | 280 | 9.8 | 10 | 2 | 28 | 3 | 9,512 | 65 |
| 50 | 250 | 10.1 | 10 | 5 | 25 | 3 | 10,625 | 72 |
| 100 | 200 | 11.2 | 10 | 10 | 20 | 3 | 12,200 | 83 |
| 150 | 150 | 11.5 | 10 | 15 | 15 | 3 | 14,425 | 98 |
| 300 | 0 | 12.2 | 12 | 25 | 0 | 3 | 14,700 | 100 |

[1] Relative to nonblocking case ($N_2 = 0$).

$$F_3^* = 2Ny + N^2/y - (y-m)k^2$$
$$= N(2y + N1y) - (Y-m)N_2^2/y^2. \quad (2)$$

The parameter $m$ is the number of middle stage matrices without cross-points removed and is determined by the blocking probability desired for traffic among only the group of $N_2$ lines.

To determine $m$ approximately, $P_B$ is the blocking probability. The probability of blocking on each link is assigned the same value $a$, which is assumed equal to one half the assigned access line occupancy of this array It can be shown that log $P_B = m \log(2a-a^2)$ or $$m=\frac{\log P_B}{\log(2a-a^2)}. \qquad (3)$$

To find the three-stage partitioned array with the minimal number of cross-points we find the minimum of $F_3^*$ with respect to variable $y$.

EXAMPLE 1

A 300 subscriber line three-stage folded partitioned switching array was considered for an overall blocking probability $P_B$ of 0.01 and an internal switch link loading $a$ of 0.1 Erlangs. The number $m$ of middle stage matrices that were to be left intact was determined to be 3 by (4). For several different values $N_1$ of subscriber terminals to be given nonblocking service, the number of lines entering a first stage matrix $y$ was determined for a minimal cross-point configuration. The percentage of cross-points needed for a partitioned array compared to that used for a similar totally nonblocking array is given in Table I.

Note that in the previous calculations, the value of $m$ used was based upon the use of the blocking probability between two terminals on the same first stage matrix since this case given us the worst case probability of a call being blocked. This probability is given by:

$$P_B=(1-(1-a)^2)^m.$$

However, the great majority of calls in practice will be between terminals on different first stage matrices. The blocking probability in this case will be:

$$P_{B'}=(1-(1-a)^2)^{2m}.$$

Thus, for Example 1, the majority of calls (those between terminals on different primary matrices) will be blocked with a probability of 0.0001 or the square of the worst case probability.

ALTERNATE APPROACHES

It can be noticed that all middle stage matrix cross-points with coordinates $(i, i)$ connect links only between matrices serving the same group of $y$ subscribers. Thus, if the diagonal cross-points $(i,i)$ that were originally removed on every second stage matrix are replaced, nonblocking service between subscribers served by the same first or third stage matrix is restored. This restores this type of service to $N_2$ users on the same first stage matrix. This type of nonblocking service between terminals on the same first stage matrix has always existed for the $N_1$ group since they receive totally nonblocking service.

III. PARTITIONED FIVE-STAGE SWITCHING ARRAY WITH TWO LEVELS OF SERVICE

Figure 3:
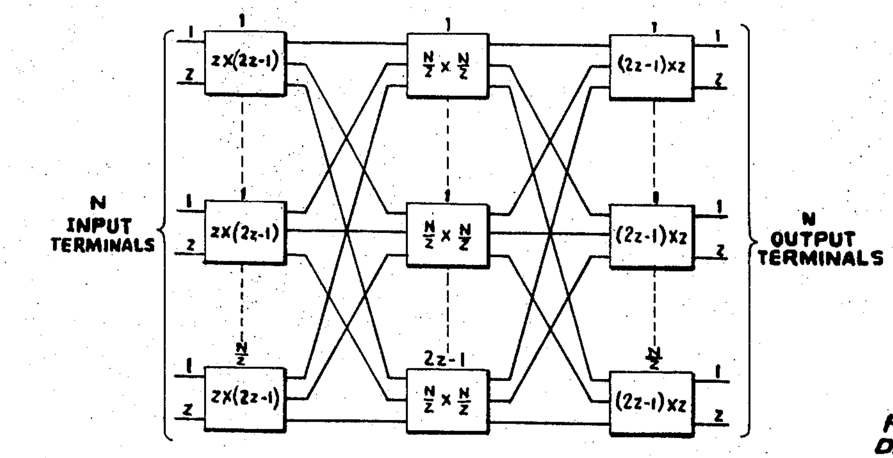
FIG. 3 is a diagram of the Clos nonblocking three-stage array.

Since all middle stage matrices in the three-stage folded array described in Section II are square and therefore nonblocking, the middle stage switches can each be replaced by a three-stage. nonfolded, nonblocking switching array to produce a five-stage, folded, nonblocking switching array. The middle three stages are composed of a Clos-type nonblocking switching array. In this smaller Clos array all first and third stage matrices are similar and the number of middle stage matrices is equal to $2z-1$, where $z$ is the number of input lines entering a first stage matrix or the number of output lines leaving a third stage matrix. Such an array is shown in FIG. 3.

Figure 4:
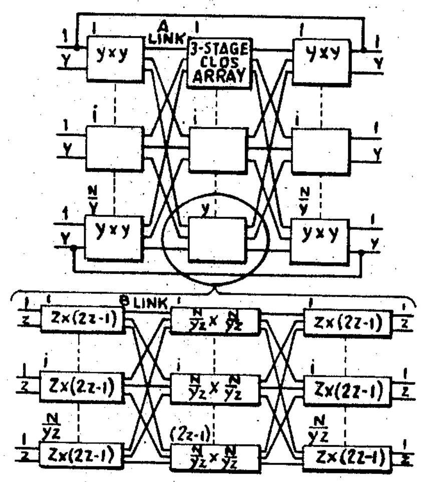
FIG. 4 is a diagram of a folded nonblocking five-stage array.

The five-stage, nonblocking, folded array resulting from the union of these above two arrays is shown in FIG. 4. All subscriber lines are served by nonblocking service. Indeed, the array is symmetrical with respect to all lines.

Figure 5:
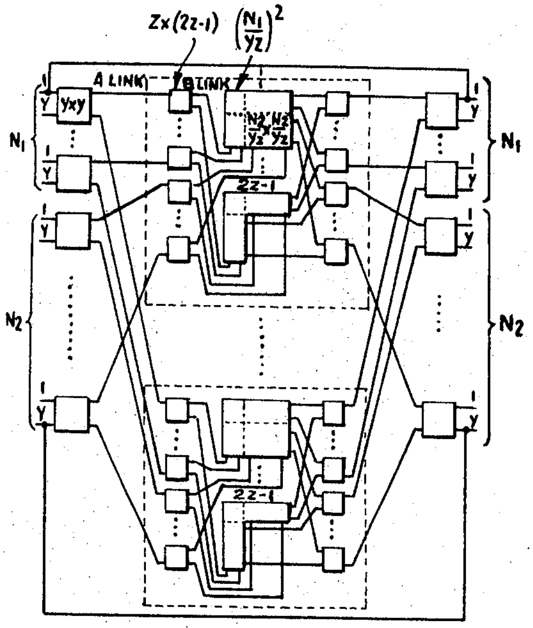
FIG. 5 is a diagram of the preferred embodiment of a two priority partitioned five-stage folded array.

A partitioned five-stage array with two levels of service is shown in FIG. 5. The first (top) $N_1$ lines are those given nonblocking service by the array. The remaining $N_2$ lines receive a specified nonzero blocking service. The number of input or output lines to each first or last stage matrix is given by $y$. The parameter $z$ is the number of input links to each individual second or fourth stage matrix and the corresponding number of output links from the matrix is $2z$—The Clos three-stage array for nonblocking requires $2z-1$ middle stage matrices. In the array of FIG. 5, this criterion will be satisfied only for the $N_1$ group of lines. Certain cross-points in the middle matrices used exclusively for connection of the $N_2$ line group among themselves will be omitted to reduce the service on these lines from nonblocking to the desired level of blocking. Again the middle stage matrices are divided into four sections. A number of subsections of the middle matrices are omitted from the totally nonblocking version of the array to increase the probability of blocking for connections among the $N_2$ terminals from 0 to the desired level.

The total number of cross-points in the partitioned five-stage array is determined by the number of middle stage square sections omitted. The size of these sections is $N_2/yz\ XN_2/yz$ crosspoints. This is because there are now $y$ Clos three-stage arrays acting as middle stages for the original three-stage folded array yielding the five-stage nonblocking array. Therefore, $N/Y$ is the total number of links entering each Clos three-stage array in the middle three stages and $N_2/y$ of these links receive blocking service. Thus, the middle three stages will form $y$ partitioned Clos arrays.

The total number of cross-points is then minimized by varying the parameters $y$ and $z$. The number of cross-points in a partitioned five-stage folded array is given by:

$$F_5^*=y(2N+C_3^*) \qquad (4)$$

where $C_3^*$ is the number of cross-points in the partitioned three-stage Clos array and $N=N_1+N_2$. Now using Clos, and subtracting the omitted sections from the unmodified close array, $$C_3^*=(2z-1)\left(\frac{2N}{Y}+\frac{N^2}{y^2z^2}\right)-(2z-1-m)\frac{N_2^2}{y^2z^2} \qquad (5)$$

where $(2z-1-m)$ gives the number of squares of size $N_2/yz \times N_2/Yz$ to be discarded from center stage matrices.

Therefore, $$C_3^*=(2z-1)\left(\frac{2N}{y}+\frac{N^2-N_2^2}{y^2z^2}\right)+m\frac{N_2^2}{y^2z^2} \qquad (6)$$

The parameter $m$, which is the number of middle stage square subsections involved exclusively in making connections among the $N_2$ group of subscribers is determined from the required probability of blocking and the estimated loading on each link.

A method of determining $m$ for a five-stage folded array is described in our aforementioned article.

Figure 6:
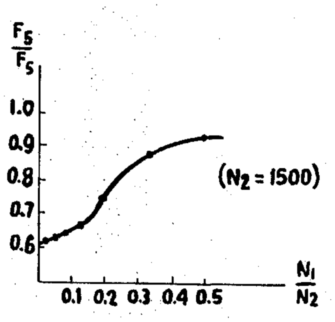
FIG. 6 is a diagram illustrating the ratio of cross-points in a partitioned five-stage array to those in comparable nonblocking five-stage array.

To illustrate the cross-point savings over the totally nonblocking case, calculations were made for certain values of $N_1$ and $N_2$. The ratio of cross-points needed in the partitioned array to that for the totally nonblocking array are shown in FIG. 6 for 1500 terminals receiving blocking service and various values of $N_1$ of nonblocking terminals. It is seen that savings are significant for low values of $N_1$ with respect to $N_2$. The value for $N_2$ was chosen as 1500 since it is known that five-stage nonblocking arrays are economical when the number of terminals is in this range.

Similar methods of those outlined in the foregoing can be applied to the case of all nonblocking switching arrays, having any odd number of stages.

IV. MULTIGRADE OF SERVICE PARTITIONED SWITCHING ARRAYS

Figure 7:
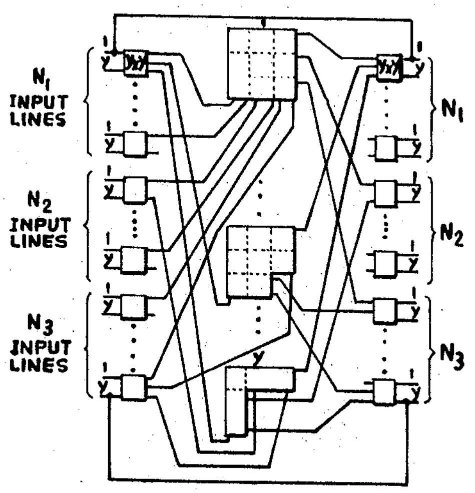
FIG. 7 is a diagram of a partitioned three-stage array with three grades of service.

In the previous sections, it has been shown how partitioned switching arrays could be constructed to provide two levels of service, one of which was nonblocking. FIG. 7 shows a three-stage folded array that will provide three levels of service. The $N_1$ groups of subscribers will receive nonblocking service ($P_1=0$) while the blocking probabilities $P_2$, $P_3$ for the $N_2$ and $N_3$ groups are such that $P_2<P_3$. A number of squares of size $N_3/y$ will be removed from the second stage matrices. The number of such removed squares is $y-m_3$ where $y$ is the number of middle stage matrices and $m_3$ is the number of matrices left intact. As before, $$m_3 \geq \frac{\log P_3}{\log (2a-a^2)}$$

where $a$ is the blocking probability assumed on each internal link. The result of this operation leaves the $N_2$ group with nonblocking service while the most that this group requires is service with a blocking probability of $P_2$. Therefore, the cross-points servicing calls among the $N_2$ group and between the $N_2$ and $N_3$ groups can be removed from a number $y-m_2$ of middle stage matrices. These cross-points form a square of dimension $N_2/y \times N_2/y$ and two rectangles each of dimension $N_2/y \times N_3/y$. The number $m_2$ which is the number of middle stage matrices keeping all cross-points that serve $N_2$ users is given by the least integer, such that:

$$m_2 \geq \frac{\log P_2}{\log (2a-a^2)}$$

Therefore, the total number of cross-points in the resulting partitioned three-stage folded array is given by:

$$F_3^* = F_3 - (y-m_3)\frac{N_3^2}{y^2} - (y-m_2)\frac{N_2^2+2N_2N_3}{y^2}.$$

Equivalently:

$$F_3^* = F_3 - (y-m_3)\frac{(N_2+N_3)^2}{y^2} + (m_2-m_3)\frac{N_2^2+2N_2N_3}{y^2}.$$

Figure 8:
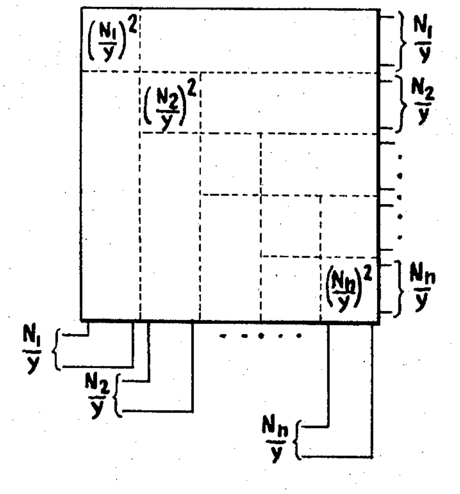
FIG. 8 is a diagram of the middle stage matrix of the multigrade partitioned array.

This is interpreted as removing squares of size $(N_2+N_3)^2/y^2$ cross-points from $y-m_3$ middle stage matrices to give both the $N_2$ and $N_3$ group a blocking probability of $P_3$ but adding back a square having $N_2^2/y^2$ cross-points and two rectangles having $N_2N_3/y^2$ crosspoints in $m_2-m_3$ middle stage matrices to give the $N_2$ group a lesser blocking probability than the $N_3$ group, equal to $P_2$. Fig 8 illustrates the middle stage of a 3-stage folded array, serving $n$ groups of lines, each requiring a different level of service. It is assumed that the probability of blocking $P_i$ for the members of the $i$th group of lines, numbering $N_i$, is such that $P_1 < P_2 < \ldots < P_n$. As a consequence, varying sized squares are removed from the middle stage matrices. Moving down from the top, that is, from the $N_1$ to the $N_n$ group of lines, the size of the squares removed is monotonically nondecreasing. That is, they either stay the same or get larger.

It is seen that connection between lines of one of the groups, say the $N_i$ group, with all groups $N_j, j \geq i$, uses a certain segment in a middle stage matrix. This segment is composed of two rectangles meeting at a right angle. Each rectangle has a width of $N_i/y$ cross-points and a height of $$(1/y)\sum_{j=i}^{n} N_j$$

cross-points These two rectangles overlap to form a square with $N_i/y$ cross-points on each side which makes each connection between lines of the $N_i$ group.

EXAMPLE 2

Consider a three-stage folded array serving a total of 300 lines, of which 10 lines are to be afforded nonblocking service, 20 are to be afforded service with a blocking probability of 0.01, and the remainder with a blocking probability of 0.05. The loading on each switch link is assumed to be 0.1 Erlangs.

It is determined that the number of center stage sections $m_{0.01}$ needed for the group of 20 lines is two, and the number $m_{0.05}$ for the groups of 270 lines is one.

The number of cross-points is the partitioned array is given by:

$$F_3^* = F_3 - (y-m_{0.05})\frac{(N_3+N_2)^2}{y^2} + (m_{0.01}-m_{0.05})\left(\frac{N_2^2+2N_2N_3}{y^2}\right)$$

where $N_2=20$ and $N_3=270$.

The last term in parentheses represents the squares and rectangles that must be added back into the equation to give the $N_2$ line group a blocking service of 0.01 rather than 0.05.

To find a minimum of $F_3^*$ with respect to $y$, again differentiate $F_3^*$ with respect to $y$ and set the resulting expression to zero. This results in the following cubic equation:

$$y^3-9.6y-321=0.$$

The solution to the nearest integer is 7. Since it is advantageous that $y$ divide into $N$ the total number of lines evenly (for manufacturing convenience), $y$ is chosen to be 6. The resulting total number of cross-points is $F_3^*=6658$ which is 44 percent of the number for the totally nonblocking case.

The same method of partitioning and removing certain portions of middle stage matrices can be applied to five-stage arrays and other symmetric arrays having an odd number of stages.

Figure 9:
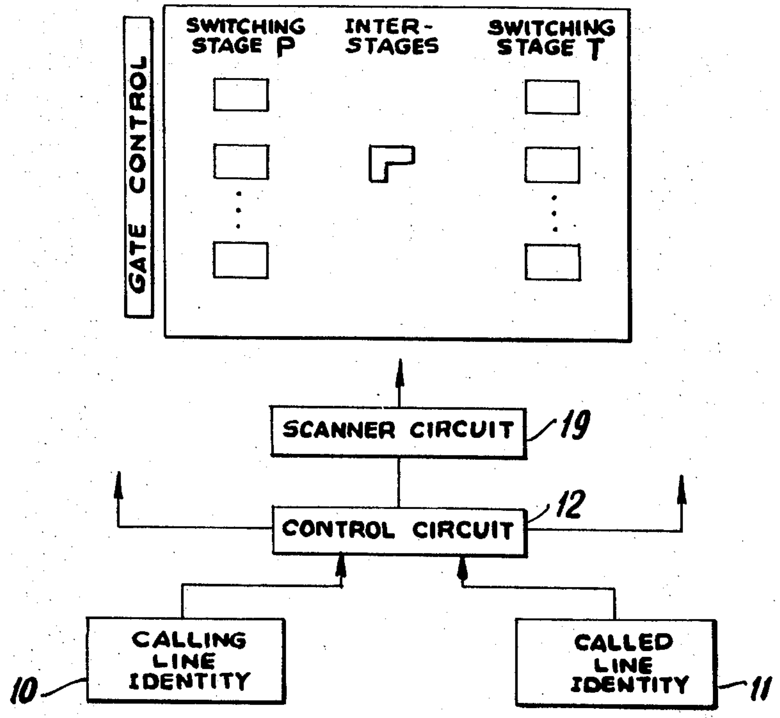
FIG. 9 is a diagram of a switching system in accordance with our invention illustrating control circuitry therefor.

The foregoing partitioned arrays may be utilized in a switching system of the type shown by Zarouni. FIG. 9 is intended to illustrate our invention in conjunction with the specific circuitry shown in the prior art systems, such as Zarouni. It will be understood by those skilled in the art that any of the partitioned arrays as described previously, may be used in conjunction with conventional systems or the system of FIG. 9. In FIG. 9, while we have shown schematically a three-stage system, it will also be understood that a multistage system may be used as explained previously as well as a multigrade system. In the five or greater stage system, the intermediate stages are nonblocking Clos type arrays with the center stage partitioned.

In FIG. 9 there is illustrated a switching system comprising two end switching stages designated the primary frame and the tertiary frame. There is also shown diagrammatically an interstage comprising a plurality of secondary frames having subframes, and it will be understood that lines as illustrated in FIGS. 2 and 5 terminate in both end switching stages to provide the folding character. In addition, in FIG. 9 there is illustrated interstage link selecting circuitry and the common control circuitry associated therewith.

The common control circuitry provides registration of the electrical indicia in connection with the vertical locations of the calling and called lines, and includes means for scanning or seeking among the links for an idle interstage link for interconnecting the preferred pair of terminations. The rectangles 10 and 11 merely show a suitable source of calling and called lines. The rectangle 12 represents circuitry for directing the sequence and manner in which one of a plurality of calling lines may be interconnected to one of a plurality of called line terminations. Details as to the operation and circuit connections have been described in the Zarouni patent and need not be discussed any further here.

In our invention, we have included a switching system comprising a plurality of switching stages, a plurality of lines, and each line having at least one line termination in each of at least two stages. These two stages may be identified by the extreme left and extreme right or end stages, the primary stage or the tertiary stage, as the case may be, or the primary stage and the $n$th stage. Any pair of line terminations may be obtained through different connections of the cross-points and it will appear that there are variable numbers or permutative pairs of such interconnections. In the three-stage array, one middle bank of a plurality of interstage links are employed, but it will be understood that in any odd array there are a plurality of interstage links. However, the number of cross-points connecting the interstage links are less than that required for nonblocking service as set forth previously. Electrical circuit means are employed including conventional link seeking means operable to seek an available appropriate link capable of connecting a particular permutative pair. The availability of particular pairs are determined as has been explained previously. The two end switching stages have an equal plurality of similarly numbered substages, and as stated previously, a plurality of called and calling lines. Each substage has an equal plurality of similarly numbered line terminals, and each line has a line termination in one line terminal of one substage of a first stage and another line termination in the similarly numbered line terminal of the similarly numbered substage of the last stage. There are associated a plurality of interstage links divided into subgroups of links including different groups serving different pairs of substages taking one substage from each stage, and a number of the cross-points interconnecting such interstage links are reduced by the factor set forth in order to provide a partitioned interstage arrangement.

There has thus been set forth an innovation in which the middle stages or intermediary stages are partitioned into subsections which have independent functions for the different priority users involved. This allows efficient arrays to be designed to afford different grades of service to the users according to priority. The middle switches may be divided into a first section which are used for connections among the high priority lines, second and third sections for use with any connection between a high priority line in a first group, and a second line in a low priority group, and a fourth section is used for connections only among the low priority lines. The partially blocking system obtained thereby affords substantial savings in switches while retaining essentially effective operation.

While the foregoing description sets forth the principles of the invention in connection with specific apparatus, it is to be understood that this description is made only by way of example and not as a limitation of the scope of the invention as set forth in the objects thereof and in the accompanying claims:

We claim:

1. A switching system comprising: an odd-numbered plurality of switching stages including end stages and a middle stage, each of said end stages comprising a plurality of similar matrices, a plurality of links coupling said end stages to said middle stage and defining a plurality of cross-points a first plurality $N_1$ of input lines given a substantially nonblocking probability, and a second plurality $N_2$ of input lines having a predetermined degree of nonzero blocking probability, coupled to selected matrices in said end stages, said middle stage being partitioned into a plurality of switching sections, each performing an independent switching function, each of said switching sections having a different number of cross-points corresponding the the values of $N_1$ and $N_2$, and having a predetermined number of matrices.

2. The system of claim 1 in which said system is a three-stage system.

3. The system of claim 1 in which said system includes five stages in which three middle stages are a Clos folded three-stage array, the middle stage of said Clos being partitioned.

4. A switching system comprising a plurality of switching stages, a plurality of lines, each of said lines having at least one line termination in each of at least two of said stages, the primary stage and the end stage, a middle switching stage coupled to said at least two stages and defining a plurality of cross-points, any pair of line terminations being obtained through different connections of the cross-points, at least one middle bank of a plurality of interstage links, the number of cross-points connecting the interstage links being less than that required for nonblocking service, electrical circuit means including link seeking means operable to seek an available permutative pair, said at least two switching stages having an equal plurality of similarly numbered matrix substages, a plurality of called and calling lines, each substage having an equal plurality of similarly numbered line terminals, and each line having a line termination in one line terminal of one substage of a first stage and another line termination in the similarly numbered line terminal of the similarly numbered substage of a last stage, a plurality of interstage links divided into subgroups of links including different groups serving different pairs of substages taking one substage from each stage, said middle stage being partitioned into subsections which have independent switching functions for the different priority users involved, thereby allowing efficient arrays to be designed to afford different grades of service to the users according to priority.

5. The system of claim 4 in which said middle switching stage is divided into a first section used for connections among the high priority lines, second and third sections for use with connection between a high priority line in a first group and a second line in a low priority group, and a fourth section used for connections only among the low priority lines.

6. The system of claim 4, having at least five of said switching stages, the intermediate ones of said switching stages being nonblocking Clos type arrays with the center stage being partitioned.